United States Patent
Wood, Jr. et al.

(10) Patent No.: US 10,157,688 B2
(45) Date of Patent: Dec. 18, 2018

(54) NUCLEAR GRADE AIR ACCUMULATING, ISOLATING, INDICATING AND VENTING DEVICE

(71) Applicant: Nuccorp, Inc., Lexington, SC (US)

(72) Inventors: Willie Turner Wood, Jr., Lexington, SC (US); Scott J. Echerer, Lexington, SC (US)

(73) Assignee: Nuccorp, Inc., Lexington, SC (US)

(*) Notice: Subject to any disclaimer, the term of this patent is extended or adjusted under 35 U.S.C. 154(b) by 0 days.

(21) Appl. No.: 15/115,676

(22) PCT Filed: Jan. 31, 2014

(86) PCT No.: PCT/US2014/014300
§ 371 (c)(1),
(2) Date: Jul. 31, 2016

(87) PCT Pub. No.: WO2015/116209
PCT Pub. Date: Aug. 6, 2015

(65) Prior Publication Data
US 2016/0351280 A1    Dec. 1, 2016

(51) Int. Cl.
*G21C 19/28*    (2006.01)
*F16K 24/04*    (2006.01)
(Continued)

(52) U.S. Cl.
CPC ............ *G21C 19/28* (2013.01); *F16K 24/044* (2013.01); *F16K 37/0016* (2013.01);
(Continued)

(58) Field of Classification Search
CPC ... F16K 24/044; F16K 37/0016; G21C 19/28; G21C 17/022; G21Y 2002/50; G21D 1/02
(Continued)

(56) References Cited

U.S. PATENT DOCUMENTS 2,707,879 A * 5/1955 Dwyer ...................... G01F 1/22
55/DIG. 34
2006/0180214 A1* 8/2006 Arentsen ............... F16K 15/188
137/613
(Continued)

FOREIGN PATENT DOCUMENTS

WO    WO 2013-075056    5/2013

OTHER PUBLICATIONS

Park, Hye Lyun; PCT/US2014/014300; International Search Report and Written Opinion; ISA/KR; dated Oct. 27, 2014.

*Primary Examiner* — Craig Schneider
*Assistant Examiner* — Angelisa L Hicks
(74) *Attorney, Agent, or Firm* — Michael A. Mann; Nexsen Pruet, LLC

(57) ABSTRACT

A device for isolating, accumulating, indicating and venting gas in a fluid system pipe includes a coupling affixed to a system pipe. The coupling includes an isolation valve. A standpipe is attached to the coupling. The standpipe holds a float trapped between a flow retaining orifice and a closed upper end save for an angled hole therein that allows gas to flow around the float. An indicator exterior to the pipe indicates the float's level in the standpipe regardless of system pressure changes. A vent valve attached above the standpipe allows controlled ventilation of the gas flowing from the system pipe through the standpipe and through the vent valve. Accumulation of gas from the system pipe lowers the float in the standpipe, at which point the user vents the gas, causing the float to rise with the rising fluid level.

10 Claims, 3 Drawing Sheets

(51) Int. Cl.
  *G21C 17/022* (2006.01)
  *G21D 1/02* (2006.01)
  *F16K 37/00* (2006.01)

(52) U.S. Cl.
  CPC ............ *G21C 17/022* (2013.01); *G21D 1/02* (2013.01); *G21Y 2002/50* (2013.01); *G21Y 2004/30* (2013.01); *Y02E 30/40* (2013.01)

(58) Field of Classification Search
  USPC .......................................................... 137/558
  See application file for complete search history.

(56) References Cited

U.S. PATENT DOCUMENTS

2006/0196261 A1\* 9/2006 Reinis ..................... G01F 23/00
                                                              73/290 R
2011/0120577 A1   5/2011 Wood, Jr.

\* cited by examiner

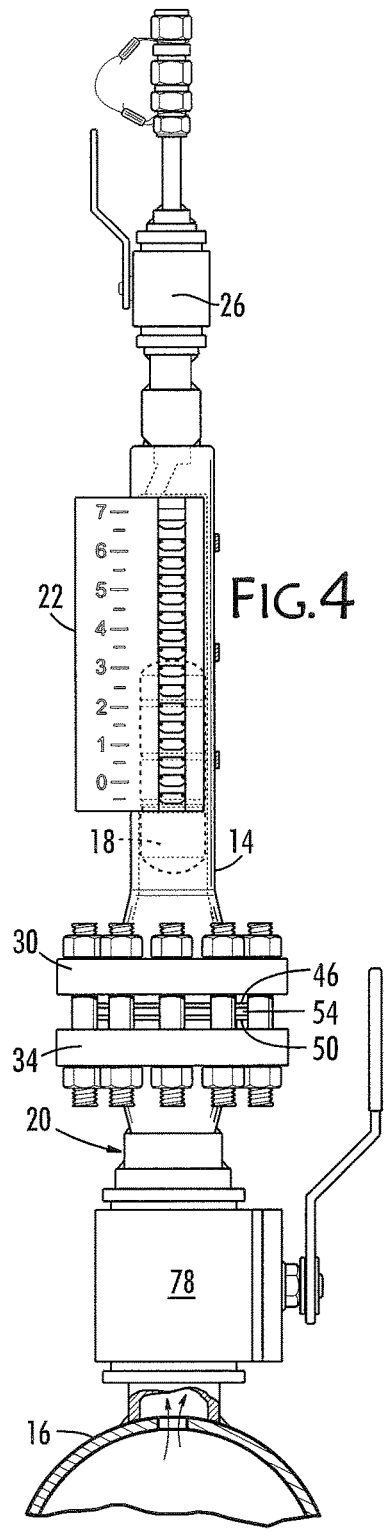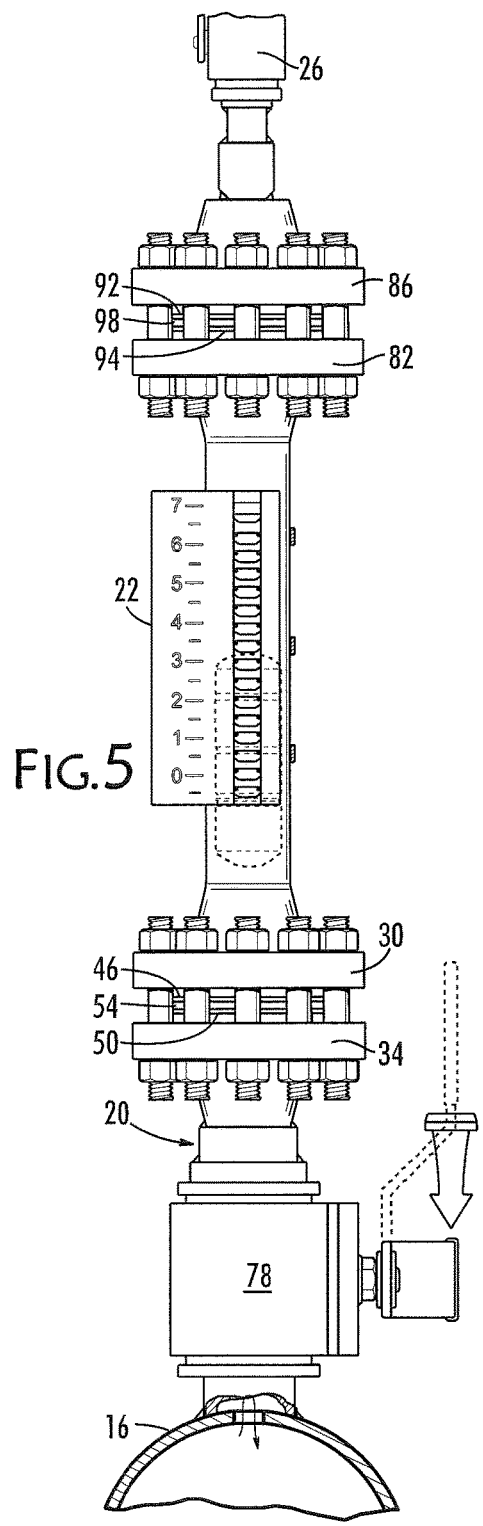

NUCLEAR GRADE AIR ACCUMULATING, ISOLATING, INDICATING AND VENTING DEVICE

BACKGROUND OF THE INVENTION

The present invention relates generally to the operation of fluid piping systems. More particularly, the present invention relates to keeping fluid piping systems free of air and other gases.

Since the advent of commercial nuclear power in the late 1960's, the industry has been aware of issues regarding the accumulation of air and other gases in the high points in various safety-related fluid systems. These systems are designed to prevent nuclear fuel damage given various postulated accident scenarios. Air and gas accumulation in these fluid systems could result in failure of these systems and, in their failure, in turn failure to prevent that fuel damage.

Among the many different manufacturers and different designs of nuclear power plants, there are substantial commonalities. One of those commonalities is the need to eliminate air accumulation from within the safety-related fluid systems. The problem is common to Pressurized Water Reactors (PWRs), Boiling Water Reactors (BWRs), Small Modular Reactors (SMRs), Pebble Bed Modular Reactors (PBMRs), and International Reactor Innovative and Secure reactors (IRIS) and all other designs.

It is common knowledge that in 2011 the damage to reactors at Japan's Fukushima Daiichi power station resulted from a Loss Of Coolant Accident (LOCA). A tsunami knocked out electric power to the plant and also flooded the backup generators needed to run the pumps that cool the reactor core. The pumps failed to operate as expected.

What is less common knowledge is that gas voids in the cooling systems in every existing nuclear plant could also cause those reactor coolant pumps to fail in a similar manner. When a gas void is introduced to a high speed pump, it creates a cavitation shock wave that can destroy the pump and damage instrumentation.

The operators of nuclear power plants are required to demonstrate that they have suitable design, operational, and testing control measures in place for complying with regulations that require, by federal law, these fluid systems to be "full", i.e. devoid of air and/or gases.

Currently in the nuclear industry, the common ways to detect unwanted air in piping system are to perform ultrasonic test (UT) examinations and to periodically vent suspect locations without knowing whether air has accumulated in those locations of the system or not. These solutions are unsatisfactory because they require radiation exposure of workers and/or the release of potentially contaminated liquids when there may not have been a need for testing or venting. Also, UT probes, in general, cannot remain connected to the piping system in question due the temperature limitations of the UT equipment and associated coupling material. As a consequence, they must be connected each time a UT examination is to be performed, thus taking additional time and resulting in additional exposure of workers to radiation.

Additionally, ultrasonic testing is both time-consuming and expensive for the utility. In the US, each high point must be tested every 30 days. Each test requires a pre-job briefing, system tag-out procedures, dress-out, ingress time, scaffold building around sensitive equipment, time to perform the ultrasonic test, removal of the scaffold, lifting the system tag-out, and egress time. These tasks are all highly procedural and many are performed in a radioactive environment. Additionally, the logistics required to support these efforts and the costs charged to the utility that result from radiation exposure are substantial. Since the formal identification of the problem by the Nuclear Regulatory Commission (NRC) in 2008, there are have been numerous "near miss" events involving gas voids in power plants in the US. Many events result from human error when using ultrasonic testing. Events involving gas voids include Ft. Calhoun (NRC Event 45970), Turkey Point (NRC Event 45971), Dresden (NRC Event 45844), Wolf Creek (NRC Event 45985), Comanche Peak (NRC Event 46786), Kewaunee (NRC Event 48051) among others.

Utilities are required to test each location every 30 days. The existing requirements allow for a dangerous gas void to exist for up to 29 of those 30 days.

The magnitude of the problem combined with the complication and expense of ultrasonic testing has led to an enormous problem for plant operators and owners.

Each existing piping system has a unique configuration of pipe length, pipe volume, system geometry, drag coefficients, pressures and temperatures such that each system would have its own unique frequency of gas accumulation—if only from evaporation. Monthly monitoring by ultrasonic testing does not allow adequate trending frequency analysis to determine if gas accumulation is a result of natural air/gas accumulation or an air leak from a valve within the system.

Currently, outside of the nuclear industry, there are a number of solutions for measuring gas accumulation in piping, for indicating the extent of the gas accumulation, and for venting the accumulated gas. However, these solutions use materials and construction practices that fail to meet the needs of the highly specialized requirements of the commercial nuclear industry, particularly if a device is to penetrate the pressure boundary of fluid piping systems. Additionally, none of the existing methods provides a means of instantly isolating the gas as it accumulates while still allowing for routine maintenance and inspections while the supported cooling system is still in full operation. None of these systems provides a means of determining the natural frequency of gas build-up within the system. With data available on only a monthly basis, trending is difficult. When gas is discovered, root cause analysis becomes difficult or even impossible. The station may discover a gas void that was caused by a single event in the previous 29 days or that the frequency of the accumulation may have changed dramatically due to a leak. Regardless, with the existing state of the art, trending analysis is hindered significantly.

Additional designs are shown and described in WO2013075056 and U.S. Pat. No. 8,505,568, which are incorporated herein in their entirety by reference.

SUMMARY OF THE INVENTION

The present invention is a device that indicates whether otherwise liquid-filled systems have trapped gas, and collects, isolates and allows for the venting of the trapped gas.

In addition to its primary functions of accumulating gas from a pipe system, isolating gas from a pipe system, indicating the amount of accumulated gas and allowing for that gas to be vented, the present device may itself be isolated from the pipe system in the event of the need to remove it for servicing, inspection or replacement, namely, by closing an isolation valve installed between the device coupling and the system pipe.

The present device may be made without welds, by machining its major components from a single cylinder of steel. A weld-free device avoids stress corrosion cracking in the harsh environment of a nuclear reactor.

In addition, the present device may have an angled hole bored at the top of the standpipe that allows the fluids that flow into the standpipe and around the float to flow out of the standpipe while the float is retained in the standpipe even when the float is pressing against upper end of the standpipe.

Still another feature of the present device may be a second set of flanges above the standpipe that allows replacement of the float or standpipe without replacement of the vent or system pipe coupling. This feature in combination with the isolation valve, dramatically improves serviceability of the present device. Servicing is simpler, faster, and with greatly reduced personal exposure to the radioactive environment of the interior of a nuclear reactor containment.

Finally, another feature of the present device is sizing of the coupling and standpipe of the present device so that it is large enough so that the water level is always visible on the scale regardless of changes in system pressure to thereby confirm that the system pipe is solid water and no gas remains in it. System pressure may range from ambient air pressure to approximately 3600 psi. As long as the water level is visible on the scale (and the isolation valve is open), all local gas in the pipe system has been accumulated and is safely isolated from the system.

These and other features and their advantages will be evident to those familiar with operation of nuclear power plants from a careful reading of the present specification accompanied by the following drawings.

BRIEF DESCRIPTION OF THE DRAWINGS

In the figures,

FIG. 4 is a side view of an air accumulating, isolating indicating and venting device, according to one embodiment of the present invention; and FIG. 5 is a side view of an air accumulating, isolating, indicating and venting device, with upper and lower flange connections, according to an alternative embodiment of the present invention.

DETAILED DESCRIPTION OF PREFERRED EMBODIMENTS

Figure 1:
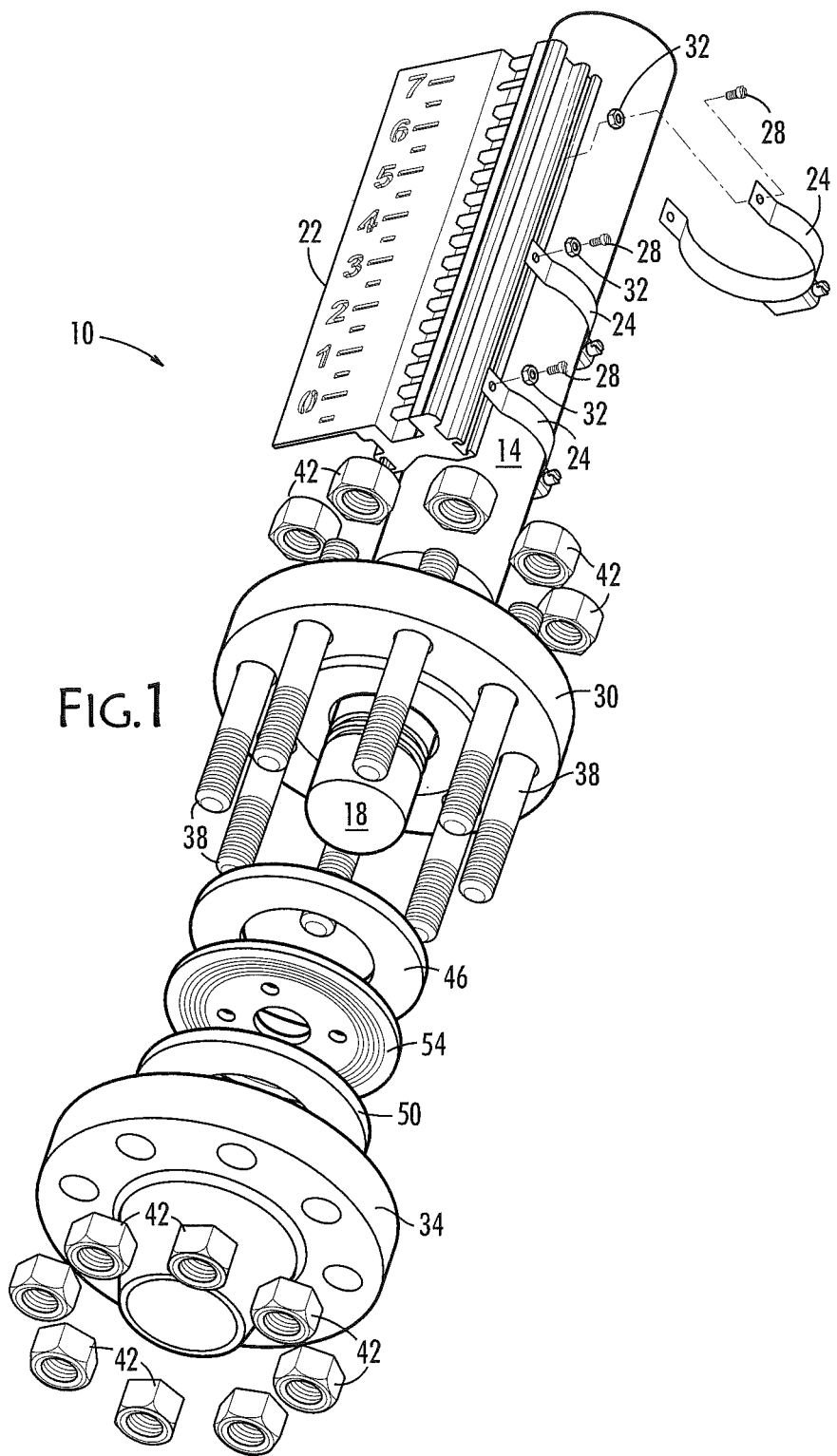
FIG. 1 is a perspective, exploded view of the air accumulating, isolating, indicating and venting device according to an embodiment of the present invention.

Referring now to FIGS. 1-5, the present invention is directed to a gas accumulating, isolating, indicating and venting device, generally referred to by reference number 10, for use in venting gas from an otherwise fluid-filled piping system. Device 10 is intended to be connected to a system pipe 16 (FIGS. 4 and 5) containing a fluid under pressure, and ideally connected to system pipe 16 at a local high point in elevation with respect to the adjacent balance of system pipe 16 so that the interior of device 10 is in fluid communication with the interior of system pipe 16. Device 10 extends above that high point via a coupling 20 so that gas in system pipe 16 will rise to that high point and from there flow through a hole made in system pipe 16 into coupling 20 and thence to a standpipe 14 where it will accumulate and remain isolated from the system until it is vented. The gas remains accumulated and is isolated by its own buoyancy. Even if the underlying system pipe 16 is called into service, the Bernoulli vacuum in standpipe 14 will not be sufficient to allow the isolated gas to reenter system pipe 16.

For simplicity, the word gas is used herein to indicate gas or gases or any kind. The word fluid refers to a non-gaseous fluid such as liquid water.

Device 10 includes standpipe 14 in fluid communication with fluid inside system pipe 16 (FIGS. 4 and 5) via a hollow coupling 20. A float 18 is freely movable inside standpipe 14, rising and falling with changes in the level of fluid in standpipe 14. The level of the fluid in standpipe 14 is defined by the uppermost surface of the fluid, which is also the boundary between fluid and gas in standpipe 14. Float 18 will ride in the fluid at the fluid level. As the fluid level changes, the position of float 18 will change accordingly. The vertical position of float 18 indicates the level of the fluid, and, by implication, the amount of gas in standpipe 14. The higher the level of the fluid in standpipe 14, the less trapped gas there is in standpipe 14.

Standpipe 14 also carries a scale 22 external to it and positioned so as to enable the position of float 18 with respect to scale 22 to be indicated in comparison to fixed markings on scale 22 so that the relative level of fluid in standpipe 14 can be compared to its nominal position or to any previous position. Float 18 may carry a magnet and scale 22 may be in registration with standpipe 14 so that the movement in position of that magnet of float 18 is reflected in the corresponding marking on scale.

Scale 22 may be fastened to standpipe 14 by spring clips 24, which are secured to scale 22 using machine screws 28 and nuts 32. A vent valve 26 (FIGS. 4 and 5) is connected to the top of standpipe 14 for venting gas that has accumulated in standpipe 14. Venting gas through vent valve 26 causes the level of fluid in standpipe 18 to rise, pushing gas through vent valve 26 and, with it, making a corresponding rise in the position of float 18 with respect to scale 22.

Figure 2:
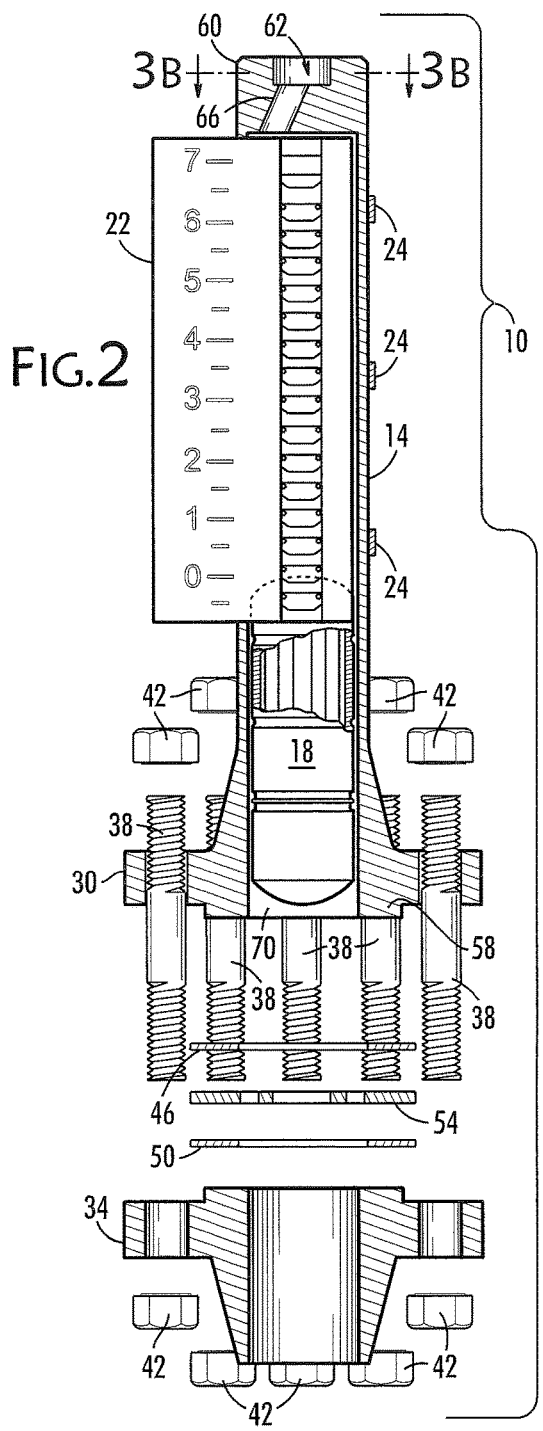
FIG. 2 is a side, exploded, partially cut-away view of the device of FIG. 1.
Figure 3A:
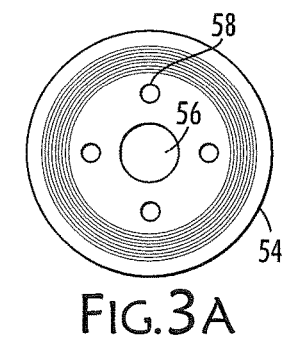
FIG. 3A is a bottom view of the float retaining orifice of FIGS. 1 and 2, according to an embodiment of the present invention.
Figure 3B:
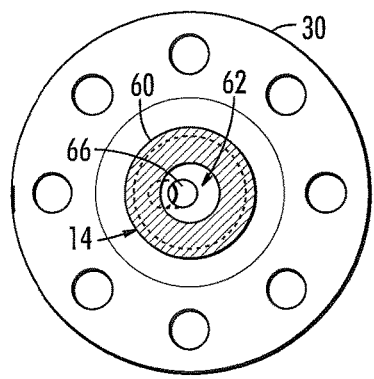
FIG. 3B is a top, cross-sectional view of the top of the standpipe of FIG. 2, according to an embodiment of the present invention.

Standpipe 14 has a lower flange 30 on its lower end that is secured to a coupling flange 34 on the upper end of coupling 20. Lower flange 30 and coupling flange 34 are secured together using a set of bolts 38 and nuts 42. However, between lower and coupling flanges 30, 34, are an upper gasket 46 and a lower gasket 50 with a float retaining orifice 54 between them, as best seen in FIG. 2 and FIG. 3A (float retaining orifice 54). Float retaining orifice 54 prevents float 18 from exiting standpipe 14 in the event of excessive gas accumulation. In particular, float retaining orifice 54 has a central hole 56 with a diameter smaller than float 18 and several lateral holes 58 so that float 18, which has rounded ends as shown in the figures, does not block flow even if it is seated on central hole 56 when it comes to rest on float retaining orifice 54.

As can best be seen in FIG. 2, standpipe 14, in cross section, includes an upper portion 60 of standpipe 14 with a socket weld recess 62 formed therein and a diagonal vent hole 66 (see also FIG. 3B) passing from the interior 70 of standpipe 14 exiting into socket weld recess 62 to vent valve 26. Vent hole 66 opens to interior 70 of standpipe 14 on an angle and away from the major axis of standpipe 14 so that float 18, which has curved ends, does not block the exit of fluid and gas from standpipe 14.

Between coupling flange 34 and system pipe 16, in coupling 20, there may be an isolation valve 78 with an open position as shown in FIG. 4 and shown in a closed position in FIG. 5 as indicated by the arrow, and that may be used to seal flow to device 10 from system pipe 16, effectively isolating device 10 from system pipe 16.

Alternatively, and as shown in FIG. 5, the connection between standpipe 14 and vent valve 26 may include an upper flange 82 and vent valve flange 86 with an upper and lower gasket 92, 94, and a second float retaining orifice 98 between them in order to allow for a simpler change-out of standpipe 14 or float 18 or both. Float retaining orifice 98 may be in the same form as float retaining orifice 54, shown in FIG. 3A. Alternatively, the embodiment shown in FIG. 4 may be back fitted by welding flanges to standpipe 16. In this embodiment, no float retaining orifice is required. Instead, angled hole 66 may continue to retain float inside standpipe 16.

The present invention has a number of advantages. First, it provides an integrated solution to issues surrounding the accumulation and isolation of unwanted gases in safety-related piping system, particularly in the nuclear industry where these requirements are stringent. It provides a convenient way to monitor the amounts of accumulated and isolated gas that improves productivity, avoids unnecessary venting, facilitates timely venting, and, in the nuclear industry, reduces personnel radiation exposure. It also provides the ability to monitor amounts of accumulated and isolated gas in piping systems in locations that may be in difficult environments, such as where ambient temperatures are high or physical elevations are high or above sensitive instrumentation. Building scaffolds to perform ultrasonic testing in these locations can be both time consuming and dangerous, in addition to exposing technicians to radiation. Furthermore, this device can provide constant verification that the piping systems are "full", which provides a nuclear licensee with the ability to prove literal compliance with regulatory requirements and for quality assurance purposes generally. Finally, based on known system pressures in the underlying system pipe, the device provides the ability to pre-select levels of air-gas accumulation and isolation limits to allow for the calculation of safe, "always full" system operation across varying system pressures at each individual location The present invention is unique from other known processes or solutions. More specifically, the present invention: (1) accumulates the gas that it collects from the system pipe; (2) isolates the accumulated gas from the system; (3) provides constant indication of accumulation of gases in otherwise liquid-filled systems, which is especially important for proving literal compliance that piping systems are "full" in the nuclear power industry; (4) allows for customization of its dimensions while still ensuring the proper minimum allowed gas level to meet nuclear regulatory requirements; (5) can be constructed and installed to specific nuclear codes and standards by the licensee's internal safety-related processes and procedures; (6) is designed to ensure proper venting flow-rates so all trapped gas is expelled during the venting process; (7) allows for convenient and rapid connection and disconnection of venting rigs and equipment.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A device for removing, isolating, measuring and venting gas from an otherwise fluid-filled system pipe in a nuclear power plant, said device comprising:
   (a) a hollow coupling having a lower end and an upper end, said lower end being attachable to and in fluid communication with the interior of a system pipe;
   (b) a standpipe having an interior, a lower end and an upper end, said lower end being attached to said upper end of said hollow coupling so that said standpipe is in fluid communication with said hollow coupling;
   (c) a float carried within said standpipe wherein, when fluid flows from said system pipe through said hollow coupling and into said standpipe, said float being configured to rise with the level of said fluid in said standpipe from said lower end to said upper end, said standpipe having a major axis, said upper end of said standpipe having an angled hole with an entrance away from said major axis of said standpipe and open to said interior of said standpipe, said angled hole being on an angle with respect to said major axis so that said float does not block said entrance of said angled hole, said angled hole of said upper end of said standpipe being configured so fluid and gas accumulates and flows around said float and through said angled hole;
   (d) a vent valve attached to said upper end of said standpipe and in fluid communication with said standpipe, said vent valve being configured to vent accumulated gas above the level of said fluid;
   (e) a float retaining orifice, said float being confined between said float retaining orifice and said upper end of said standpipe, said float retaining orifice operable to allow fluid communication between said standpipe and said system pipe;
   (f) an indicator carried exterior to said standpipe and responsive to movement of said float within said standpipe, said indicator configured to indicate the level of said fluid in said standpipe; and
   (g) an isolation valve installed in said coupling, said isolation valve having a closed position and an open position, said system pipe being isolated from said standpipe when said isolation valve is in said closed position.

2. The device as recited in claim 1, wherein said hollow coupling and said standpipe are sized to accommodate changes in pressure in said system pipe so that the level of said water in said standpipe is indicated on said indicator before and after said changes.

3. The device as recited in claim 1, wherein said indicator is a scale affixed to said standpipe and having a sequence of numbers thereon, said scale being in registration with said standpipe so that said numbers on said scale correspond to the position of said float within said standpipe.

4. A device for use in removing, accumulating, isolating and venting gas from an otherwise liquid-filled system pipe in a nuclear power plant, said device comprising:
   (a) a hollow coupling having a lower end and an upper end, said lower end being attachable to and in fluid communication with the interior of a system pipe, said upper end having a coupling flange;
   (b) a standpipe having an interior, a lower end and an upper end, said lower end having a lower flange and being attached to said coupling flange of said hollow coupling so that said standpipe is in fluid communication with said hollow coupling, said upper end of said standpipe having an upper flange with an angled hole formed therein;

(c) a float carried within said standpipe, wherein, when fluid flows from said system pipe through said hollow coupling and into said standpipe, said float rises inside said standpipe with the level of said fluid in said standpipe from said lower end to said upper end, said upper end of said standpipe having a angled hole with an entrance away from said major axis of said standpipe and open to said interior of said standpipe, said angled hole being on an angle with respect to said major axis so that said float does not block said entrance of said angled hole, said angled hole of said upper end of said standpipe being configured so fluid and gas accumulates and flows around said float and through said angled hole;

(d) a vent valve having a lower end with a vent flange, said vent flange of said vent valve being attached to said upper flange of said standpipe so that said vent valve is in fluid communication with said standpipe for venting gas accumulated above the level of said fluid in said standpipe;

(e) two float retaining orifices, a first float retaining orifice of said two float retaining orifices being positioned between said coupling flange and said lower flange of said standpipe, a second float retaining orifice of said two float retaining orifices being between said upper flange of said standpipe and said vent flange, said float being confined between said two float retaining orifices; and (f) an indicator carried exterior to and in registration with said standpipe and responsive to movement of said float within said standpipe to thereby indicate the level of said fluid in said standpipe.

5. The device as recited in claim 4, wherein said float has a diameter and an axis aligned with said axis of said standpipe and wherein each float retaining orifice of said two float retaining orifices has at least one hole lateral to said axis of said standpipe and smaller than said diameter of said float, through which said at least one hole said fluid can flow.

6. The device as recited in claim 4, further comprising an isolation valve carried by said hollow coupling, said isolation valve having a closed position and an open position, said system pipe being isolated from said standpipe when said isolation valve is closed.

7. The device as recited in claim 4, wherein said standpipe is sized to accommodate changes in pressure in said system pipe so that the level of said water is visible on said indicator before and after said changes.

8. The device as recited in claim 4, wherein said indicator is a scale affixed to said standpipe in registration therewith and having a sequence of numbers thereon.

9. A device for removing, accumulating, isolating, and venting gas in an otherwise fluid-filled system pipe in a nuclear power plant, said device comprising:

(a) a hollow coupling having a lower end and an upper end, said lower end being attachable to and in fluid communication with the interior of a system pipe;

(b) a standpipe having a major axis, an interior, a lower end and an upper end, said lower end being attached to said upper end of said hollow coupling so that said standpipe is in fluid communication with said hollow coupling;

(c) an isolation valve installed in said hollow coupling, said isolation valve having a closed position and an open position, said system pipe being isolated from said standpipe when said isolation valve is closed;

(d) a float carried within said standpipe wherein, when fluid flows from said system pipe through said hollow coupling and into said standpipe, said float rises with the level of said fluid in said standpipe from said lower end to said upper end, said upper end of said standpipe having an angled hole formed therein at an angle with respect to said major axis of said standpipe so that said float does not block said entrance of said angled hole, and through which angled hole fluid and gas flow around said float as said float is retained inside said standpipe;

(e) a vent valve attached to said upper end of said standpipe and in fluid communication with said standpipe for venting gas accumulated above said fluid level that flows through said hole in said upper end of said standpipe; and (f) an indicator carried exterior to said standpipe and responsive to movement of said float within said standpipe to thereby indicate the level of said fluid in said standpipe.

10. The device as recited in claim 9, wherein said standpipe is sized to accommodate changes in pressure in said system pipe so that a water level will be visible on said indicator before and after said changes.

* * * * *